Oct. 22, 1968
H. MAGNUSKI
3,406,775
VEHICULAR SPEED INDICATOR, ODOMETER AND
AUTOMATIC SPEED CONTROL SYSTEM
Filed Aug. 5, 1965
2 Sheets-Sheet 1
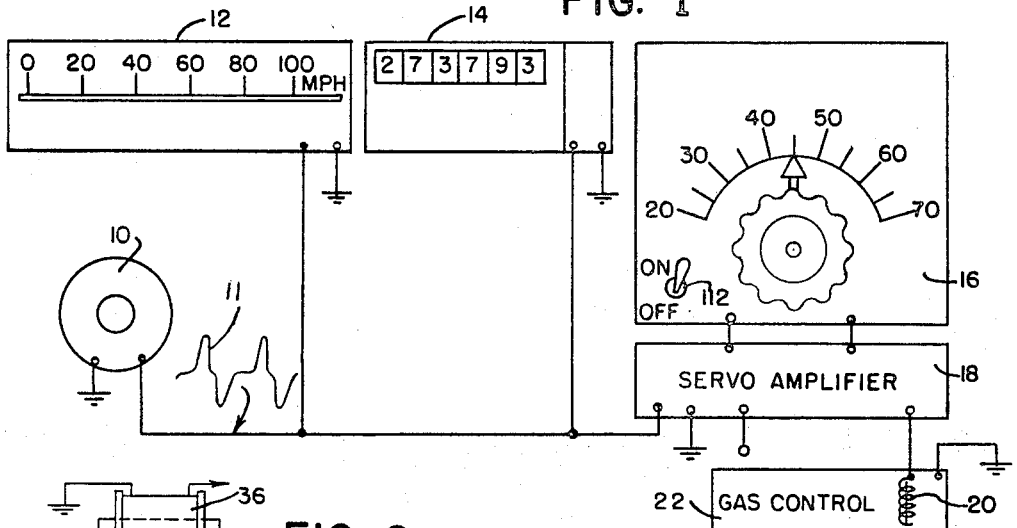
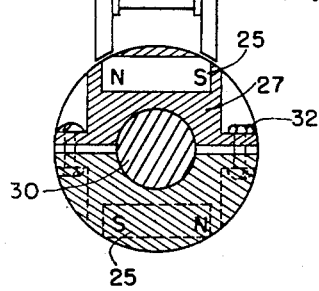
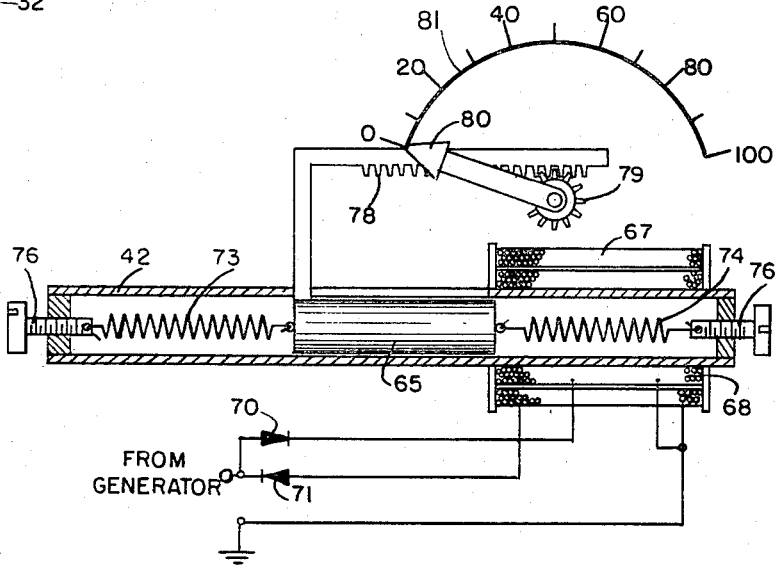
INVENTOR
HENRY MAGNUSKI
BY
ATTYS.

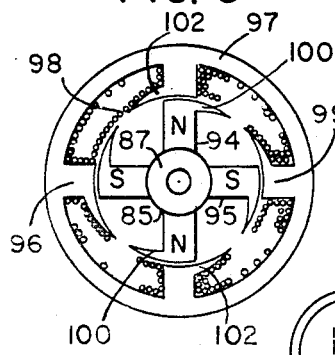
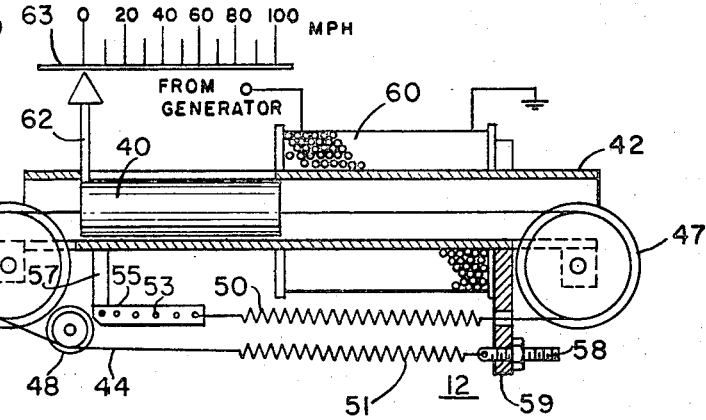
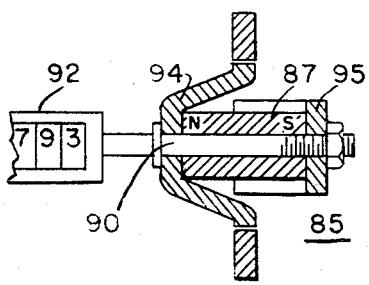
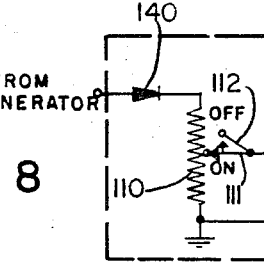
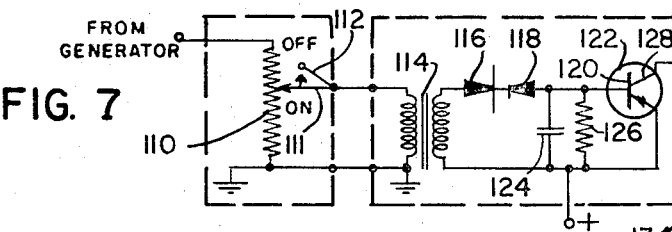
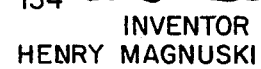

United States Patent Office 3,406,775
Patented Oct. 22, 1968

3,406,775
VEHICULAR SPEED INDICATOR, ODOMETER AND AUTOMATIC SPEED CONTROL SYSTEM
Henry Magnuski, Glenview, Ill., assignor to Motorola, Inc., Franklin Park, Ill., a corporation of Illinois
Filed Aug. 5, 1965, Ser. No. 477,497
6 Claims. (Cl. 180—105)

ABSTRACT OF THE DISCLOSURE

In this system, an alternating pulse generator generates positive and negative-going signals representing the movement of the vehicle. The amplitude of the generated signals are directly proportional to the rate of the vehicle while each pulse represents an increment of movement of the vehicle. The vehicle speedometer includes a magnetic slug that is movably mounted in a tube around which is positioned a coil that is responsive to the signals from the generator coupled thereto to move the slug for indicating the rate of travel of the vehicle. The odometer includes a pulse motor that is connected to the output of the generator and is responsive to each of the generated pulses to indicate the increments of movement of the vehicle. The speed control system includes a potentiometer connected to the output of the generator which selects a signal level corresponding to the desired rate of travel of the vehicle. A Zener diode is connected to the potentiometer and breaks down and conducts when the generated signal exceeds the selected signal level. Conduction of the Zener diode operates a transistor amplifier which controls a solenoid. The solenoid operates a linkage which automatically controls the rate of speed of the vehicle.

This invention pertains generally to an electrical system for indicating and controlling the movement of a cyclically moving member, and more particularly to an electric odometer, speedometer, and automatic speed control for an automobile.

Speedometers and odometers presently in use in automobiles utilize mechanical drive cables for connecting a portion of the vehicle which rotates at a speed proportional to the speed of the vehicle to the indicating and recording mechanism of the speedometer and odometer. Thus, for example, the cable may extend from the transmission or drive shaft of the vehicle, to the speedometer in the dash panel. Mechanical speedometer cables are subject to a number of difficulties such as high frequency chatter, and difficulty of assembly and placement in the vehicle.

It has been proposed to utilize a speedometer and odometer which is electrical to eliminate the lengthy mechanical cables. However, such systems have heretofore been complex and unreliable. Sufficient power to drive conventional type indicators has necessitated amplifiers and power supplies. A system which has a speed responsive device with enough power to activate a simple speed indicator and odometer, while retaining compactness, would be highly desirable. Such a system would not only eliminate the delicate and expensive d'Arsonval type ammeter movement frequently used as speedometers, but could also be used to operate an automatic speed control for the automobile.

With the advent of the modern highway system in this country, the number of hours of continuous travel which is accomplishd in constant speed zones has been increased to the extent that automatic speed control has taken on added importance. Traveling long hours at the same speed can be very fatiguing, not only because of the effort required to steer the car, but also because of the continuous process of observing the speed on the speedometer and varying the foot pressure on the accelerator to maintain a steady rate of travel. In addition to being fatiguing, continuous acceleration and deacceleration over long periods adds significantly to engine wear and reduces gas mileage.

It is one object of this invention to provide an improved system for counting the number of cycles and indicating and controlling the repetition rate of a cyclicly moving member.

Another object of this invention is to provide an electrical speedometer and odometer for a vehicle that is relatively simple and inexpensive to manufacture.

Still another object of this invention is to provide an electronic speedometer and odometer and an automatic speed control for a vehicle which does not utilize a mechanical drive cable and operates independently of car battery voltage.

Yet another object of this invention is to provide an automatic speed control for a vehicle that reduces driver fatigue and increases gasoline mileage.

One feature of this invention is a system for counting the number of cycles and indicating and controlling the repetition rate of a cyclicly moving member having an alternating current, signal generator with a permanent magnet, which operates in response to the cyclic movement of the member to produce signal pulses representing such movement, an electromagnetic indicator responsive to the amplitude of the signals for indicating the repetition rate of the cyclicly moving member, and an electromagnetic counter responsive to the signal pulses for counting the number of cycles of the cyclicly moving member.

Another feature of this invention is a system for counting the number of cycles and indicating and controlling the repetition rate of a cyclicly moving member, which has a selective repetition rate control knob for setting a potentiometer for establishing a voltage level. A control servoamplifier is coupled between the potentiometer and solenoid activated rate control means, and, when the repetition rate of the member exceeds the selected repetition rate, signals are applied from the potentiometer to the control servoamplifier thereby exciting the solenoid to actuate the rate control means for controlling the repetition rate of the cyclicly moving member.

Still another feature of this invention is an electric speedometer for an automobile having solenoid means responsive to the signal from the signal generator for magnetically attracting a metal slug and sliding the same in a guide, with the magnetic field strength of the solenoid being proportional to the amplitude of the generated signals. Springs support the slug in the guide and bias the same against the magnetic attraction of the solenoid. The tension on the springs is variable for controlling the motion of the slug by the solenoid thereby providing means for calibrating the speedometer so that the amplitude of the signals are translated by the motion of the slug to indicate the rate of travel of the automobile on the speedometer.

Yet another feature of this invention is an odometer for an automobile having an electromagnetic motor with the rotor including a parmanent magnet and a plurality of substantially L-shaped pole pieces with adjacent pole pieces being of an opposite polarity, and the stator including a coil encircling the same and a plurality of substantially L-shaped integral poles equal in number to the pole pieces of the rotor and mounted coaxially therewith, with the feet of the L-shaped pole pieces extending in a direction opposite from the direction that the feet of the L-shaped poles extend so that each time the signal polarity and the magnetic flux in the stator poles change, the rotor poles are repulsed from the occupied position and rotate in the direction of the L-shaped pole feet to which they are now attracted. A counter is coupled to the rotor to record each rotation thereof for indicating the increments of movement of the automobile.

In the drawings:

FIG. 1 is a block diagram of the indicating and control system of the invention;

FIG. 2 is a side elevation partially in cross-section of the signal generator of the system of FIG. 1;

FIG. 3 is a schematic wiring diagram and side elevation cross-section of the speedometer in the system of FIG. 1;

FIG. 4 is a side elevation cross-section of a second embodiment of the speedometer of FIG. 3;

FIG. 5 is a front elevation of the drive mechanism for the odometer in the system of FIG. 1;

FIG. 6 is a side elevation in cross-section of the rotor of the drive mechanism of FIG. 5;

FIG. 7 is a schematic wiring diagram of the automatic rate control circuit shown in the system of FIG. 1; and FIG. 8 is a schematic wiring diagram of a second embodiment of the automatic rate control circuit of FIG. 7.

In practicing this invention a signal generator which could be a small alternator with rotating permanent magnets is attached to the drive shaft of an automobile. In response to the movement of the shaft, the magnets rotate in front of an iron yoke attached to the frame of the car on which a coil is wound thereby generating positive and negative signal pulses representing the movement of the car. The amplitude or votage of the generated signal pulses and the frequency thereof are directly proportional to the speed of the car. The generated signal is coupled to either one or two separate coil windings of the speedometer and excite the same to attract and slide a metal slug in a guide. Springs support the slug in the guide and bias the same against the magnetic attraction of the coil. Because the magnetic field strength of the solenoid is proportional to the amplitude of the signal and the tension on the springs is variable for controlling the movement of the slug by the solenoid, it is possible to calibrate the speedometer so that the amplitude of the signals are translated by the motion of the slug to indicate the rate of movement of the automobile.

The signal from the generator is also coupled to the stator winding of an electromagnetic motor which drives the counter of the odometer. Integral with the stator are a plurality of substantially L-shaped poles. Mounted coaxially with the stator is the rotor which has a permanent magnet and a plurality of substantially L-shaped pole pieces equal in number and directly opposing the poles of the stator. The feet of the L-shaped pole pieces extend in a direction opposite to the direction that the feet of the L-shaped poles extend so that each time the signal polarity and the magnetic flux in the stator poles change, the rotor poles are repulsed from the occupied position and rotate in the direction of the L-shaped pole feet to which they are now attracted. A counter is coupled to the rotor to record each rotation thereof for indicating the distance traveled by the car.

A manual control knob on the dashboard of the automobile calibrated in miles per hour varies a potentiometer to select a portion of the generated signal as a voltage level corresponding to the desired rate of travel of the automobile. When the speed of the car exceeds the set speed, the portion of the generated signal selected by the potentiometer exceeds the reference voltage set up by a Zener diode, and is amplified in a control servoamplifier and used to excite a rate control solenoid to reduce the speed of the car to the desired level.

Referring more specifically to the drawings, FIG. 1 shows a signal generator 10 that is responsive to a predetermined movement of the automobile for producing a signal having pulses each representing an increment of movement of the automobile, and with the amplitude of each pulse representing the speed of movement. The signal is coupled to a solenoid operated speedometer 12 that is responsive to the amplitude of the signal for indicating the rate of travel of the automobile and to an electromagnetic motor driven odometer 14 that is responsive to the number of the signal pulses for counting and indicating the increments of movement of the automobile. Mounted to the dashboard is a speed control knob 16 that has a dial calibrated to miles per hour and an indicator for setting the desired speed limit of the car. When a particular speed is set by the knob, a part of the signal is selected and when this part exceeds a reference voltage, it is amplified in the speed control servoamplifier 18. This amplified signal is then coupled to a solenoid 20 that operates a gas control device 22 that controls the rate of the speed of the car.

One particular embodiment of the signal generator 10 is shown in greater detail in FIG. 2, and consists of a stator with an iron yoke 34 and coil 36 wound around it and a rotor having two permanent magnets 25 embedded in a suitable aluminum or zinc casting 27. The casting 27 is made in two halves in order to permit it to be easily attached to the drive axle 30 by bolts 32. An iron yoke 34 is attached to the frame of the car and has a coil 36 wound around it. Rotation of the axle 30 causes the magnets 25 to rotate in front of the iron yoke 34. The generator could be attached at other suitable locations that reflect the actual movement of the car, for instance the stator could be attached inside a wheel to the nonrotating part supporting the brake shoes while the magnets could be attached to the rotating brake drum. Each time one of the magnets 25 passes in front of the yoke 34, it generates a positive or negative signal pulse as shown by waveform 11 (FIG. 1), completely independent of the car battery. The amplitude and frequency of the generated signals are each directly proportional to the speed of the car. The size of the signal generator 10 and the number of turns on the coil 36 is selected to provide adequate power to operate the speed indicator 12 and the odometer 14 at the lowest pratical speed.

One relatively simple rate indicator or speedometer 12 that operates independently of the car battery voltage is shown in detail in FIG. 3. It consists of a soft iron slug 40 that is slidably guided by the tube 42. String 44 is attached at either end of the slug 40, passes around the pulleys 46, 47 and 48 and is terminated at each end by springs 50 and 51. The other end of spring 50 is secured in one of the holes 53 in arm 55 connected to support bracket 57. The other end of spring 51 is connected to scerw 58 which is threaded through support bracket 59. A coil 60 is wound around the tube 42.

In operation, signal pulses from the signal generator 10 are coupled to the coil 60 without being rectified, causing the magnetic iron slug 40, which is being maintained in equilibrium by the tension of the springs 50 and 51, to be drawn into the coil 60. The faster the car travels the greater is the amplitude of the generated signals and the stronger is the magnetic field of the coil and the resultant pull on the slug 40 against the tension of the springs 50 and 51. Because the tension on the springs 50 and 51 can be adjusted by securing the end of the spring 50 in different holes 53, by securing the arm 55 in a different position with respect to the support bracket 57 and by adjusting the screw 58, both the zero position of the slug 40 and the speed indicator can be calibrated so that the amplitude of the generated signals are properly translated by the device to indicate the rate of movement of the car. To indicate the speed, an arrow 62 is attached to the slug 40 and moves along the speed scale 63.

By changing the density of turns at different points of the coil or by using a series of short coils with a different number of turns, different types of speed indication is possible. For instance, the speed scale 63 could be expanded at certain speeds more frequently used, such as from 30 to 60 miles per hour, from the uniform graduation indicated in the drawing.

In order to minimize friction, the speed indicator mechanism could be immersed in liquid, and the slug 40 made partially hollow to a point where it would have the same density as the liquid so that it would float in the liquid and not rest on the bottom of tube 42. This would reduce the friction between the tube 42 and slug 40 thereby providing a sensitive and complete backlash free indicator.

FIG. 4 indicates a second embodiment of the rate indicator or speedometer 12. In this embodiment, the soft iron slug 40 is replaced by a permanent magnet slug 65. Much less energy is required in this case to provide equivalent slug pulling force, however, the signal from the signal generator 10 must be rectified. By having two oppositely wound coils 67 and 68 encircling the guide tube 42 and coupling the signal components through the rectifying diodes 70 and 71 to the individual coils, maximum slug pulling force is generated by using a minimum of circuit components. Springs 73 and 74 are connected from either end of the magnet 65 to screws 76 threaded through the ends of guide tube 42. The function of the springs is the same as described in the previous embodiment, and the tension thereon is varied by rotating the screws 76. To indicate the speed, movement of the magnet 65 causes the rack 78 connected thereto to rotate the pinion gear 79 and its associated arrow 80 along the semicircular speed indicator 81. The speedometer 12 is calibrated as previously described. In addition, calibration could be accomplished by connecting a small variable resistance in series with the signal generator 10 and the two diodes 70 and 71 for regulating the amplitude of the generated signal. Some of the features of the second embodiment can be included in the first embodiment or vice versa. For example, the rack and pinion gear can be included in the first embodiment while liquid immersion can be used in the second one.

An odometer that can be used with this system is shown in detail in FIGS. 5 and 6. It is a brushless electromagnetic motor that functions independently of the car battery voltage. The rotor 85 (FIG. 6) of the motor consists of a permanent magnet 87 in the form of a hollow tube. An axle 90 extends through the tube 87 and has connected thereto a standard counter 92 for indicating the miles traveled by the car. L-shaped pole piece washers 94 and 95 made, for example, from soft iron sheet, are mounted to the axle 90 at the opposite ends of and in rotatable contact with the tube shaped magnet 87; so that the pole pieces of washer 94 are of one polarity and the pole pieces of the washer 95 are of the other polarity. The manner in which the pole pieces are formed to the washers enables them to rotate in approximately the same plane about tube 87. The stator 97 of the motor (FIG. 5) has a winding 98 encircling it and integral L-shaped poles 99 equal in number to the pole pieces of the rotor 85.

In operation, the rotor 85 is mounted coaxially with the stator 97, with the poles and pole pieces lying in approximately the same plane and opposing each other. A bipolar signal from the generator 10 is coupled to the winding 98 without rectification. When the signal pulse is of one polarity in the winding, the pole pieces of the rotor 85 are attracted to the opposite pole of stator 97. As the signal reverses polarity, the polarity of the stator poles 99 are reversed and the rotor pole pieces will be repulsed from them, but, because the feet 100 of the L-shaped pole pieces are pointed in one direction and the feet 102 of the L-shaped pole are pointed in the opposite direction, the magnetic field will be such that the pole pieces will be attracted strongly to the next pole 99, and will always rotate in the same direction. The amount of rotation of the rotor 85 and of the mileage counter 92 to which it is coupled depends only on the number of signal pulses and not on the amplitude of the signal. Therefore, the number of revolutions of the motor will be strictly proportional to the mileage driven and independent of the speed of the car. This means that the correct mileage of the car will be shown even if it is driven backwards.

Although the rotor and stator are each shown having four poles, this number could vary providing the rotor and stator always have the same number of poles. If more poles are added, the motor would rotate only a small fraction of a revolution for each applied signal pulse, activating the mileage counter slowly, but with more force than in the case where a smaller number of poles is used. Rotation of the meter by the motor can be calibrated so that the counter will provide the same information as the standard odometer.

The automatic rate control of the system is shown in FIG. 7. It operates independently of the car battery voltage on the principle that the amplitude of the generated signal is directly proportional to the speed of the vehicle. Setting the desired speed limit with the speed control knob 16, varies the movable tap 111 on potentiometer 110 to vary the setting of potentiometer 110 thereby establishing a signal level which represents the selected speed. If the speed of the car exceeds the set speed, the amplitude of the signal from the generator 10 will exceed the reference level as set by the Zener diode 116. The peaks of this signal are then used in a suitable servoamplifier to control the engine speed.

The system is energized by operation of the switch 112. A portion of the generated signal is coupled from the potentiometer 110 to the transformer 114. The secondary winding of the transformer 114 feeds the signal components through Zener diode 116 and blocking diode 118 to the load resistor 126. The capacitor 124 provides a steady level of signal across the load resistor 126. The capacitor 124 is not essential to the operation of the system and its inclusion in the circuit is optional. The voltage across resistor 126 is applied between the base and emitter of the PNP transistor 122. The diodes 116 and 118 are chosen so that only negative signal components which are stronger than the breakdown voltage of the Zener diode 116 will be applied to the base 120. Negative signal components less than the breakdown voltage of the Zener diode will be blocked thereby, and all positive pulses will be stopped by the blocking diode 118. Therefore, only if the negative peaks of the generated signal exceed the Zener diode 116 breakdown voltage will the negative voltage charge capacitor 124 and appear at the base 120 of transistor 122, biasing it into conduction. When transistor 122 is conducting, the solenoid 20 in the collector 128 circuit is energized. The core 130 is attracted inside the coil and thereby controls the engine speed in a manner to be subsequently described.

For example, by selecting an arbitrary speed of 50 miles per hour on the knob 16, the movable tap 111 on the potentiometer is adjusted to establish a signal level for that speed. In essence, the potentiometer 110 selects a portion of the pulse from the generator 10 to be coupled by the transformer 114 to the Zener diode 116, which has a known breakdown voltage. The larger the portion of the voltage that is selected by the potentiometer 110 to be coupled to the Zener diode the slower the car has to travel (the less voltage the generator has to develop) to cause the diode 116 to breakdown. The converse is equally true. Therefore, the potentiometer is set to couple a selected portion of the generator voltage to the Zener diode 116 that will not cause the Zener level to be exceeded unless the car travels at a speed greater than 50 m.p.h. When this happens, the negative signal components of the generated signal overcome the Zener level of diode 116 and pass through diode 118 to the base 120 of PNP transistor 122, driving that transistor into conduction. When transistor 122 conducts, the solenoid 20 is energized attracting core 130.

One example shown in FIG. 7 of an implementation of car speed control will be now described. Attached to the core 130 and raised by it, is the float 132 located in the carburetor fuel bowl 134. When the float is lifted, the gasoline supplied to the fuel bowl will be cutoff by the needle valve 136, and the gas level will start to drop.

The gas mixture becomes lean and the car will not be able to accelerate past the desired speed limit. This method of speed control has an advantage in that the leanest possible mixture will be used to provide the desired speed thereby providing excellent gas mileage. There are other ways to control the speed of the car with solenoid 20. For example, by having it mechanically open and shut the gasoline valve, by cutting off the electric gasoline pump if one is used, or by coupling the solenoid to the throttle control. If coupled to the throttle control, it can either decouple the throttle from the gas pedal or reset its position versus the pedal position in accordance with the speed desired, as shown in FIG. 8. The gas pedal link 182 is connected to throttle arm 180 by spring 181 which has sufficient tension to overcome the friction of throttle 180 without expanding. Thus, in normal operation of the car, the throttle 180 follows the movement of pedal link 182 faithfully. A separate spring 183 is used to return the pedal to its upward position when the foot is not depressing it. However, when solenoid 20 is energized by the speed control servoamplifier, slug 130 is attracted and pulled up toward coil 20 thus overcoming the tension in spring 181 and closing throttle 180 regardless of the position of the gas pedal. Therefore, the speed of the car is controlled by decoupling the throttle control from the gas pedal when the preset speed limit is reached. The important point of this invention is not the mechanical means for actually controlling the speed of the car, but the energizing of the solenoid 20 to actuate the mechanical means.

A second embodiment of the servoamplifier 123 is shown in FIG. 8. In this embodiment the signal from the generator 10 is coupled to the potentiometer 110 through the diode 140 so that only positive components of the signal are coupled thereto. The positive siganl components are then coupled through the Zener diode 142 to the base 144 of NPN transistor 145 which is biased off by the resistor 146, connected between the emitter 148 and the base 144. The resistor 149 is connected between the power supply and the collector 150. The transistor 145 is normally nonconductive because its base is grounded through resistor 146. However, if the selected portion of the positive signal pulses from potentiometer 110 exceeds the Zener diode 142 breakdown voltage, the positive potential will increase on the base 144 driving the transistor 145 into conduction. When transistor 145 is conducting, the collector 150 is close to ground potential. Since the base 152 of the PNP power output transistor 154 is coupled to the collector 150, it will be driven into conduction thereby energizing the solenoid 20 to control the speed of the car as previously described. Because this embodiment of the servoamplifier 123 has two stage amplification, it provides a more positive speed control.

What has been described, therefore, is a relatively simple and economical electrical speedometer and odometer for a vehicle which eliminates the need for a mechanical drive cable and provides an automatic rate control for a vehicle which increases gasoline mileage and reduces driver fatigue; all of which devices are completely independent of the car battery voltage variations.

What is claimed is:

1. A speedometer for an automobile including in combination, alternating current signal generator means responsive to a predetermined movement of the automobile, with the amplitude of said signals representing the rate of movement thereof, guide means, a magnetically attractable slug slidably mounted in said guide means, rate indicator means attached to and moving with said slug for visually indicating the rate of movement of the automobile, solenoid means responsive to said signals for magnetically attracting said slug and sliding the same in said guide means with the magnetic field strength of said solenoid means being proportional to the amplitude of said signals, and first and second springs each connected at one end to a respective end of said slug and each having the other end adjustably connected to said guide means, said springs maintaining said slug in equilibrium in said guide means and biasing the same against the magnetic attraction of the solenoid, said adjustably connected other ends of said springs varying the tension for controlling the motion of said slug by said solenoid means thereby providing calibration for said rate indicator means so that the amplitude of said signals are translated by the motion of said slug to indicate the rate of movement of the automobile on said rate indicator means.

2. A speedometer for an automobile including in combination, alternating current signal generator means including a permanent magnet responsive to a predetermined movement of the automobile, with the amplitude of said signal representing the rate of movement thereof, guide means, a permanent magnet slidably mounted in said guide means, rate indicator means attached to and moving with said magnet for visually indicating the rate of movement of the automobile, solenoid means having first and second oppositely wound coils, rectifier means for coupling signal components of one polarity from said signal generator to said first coil and signal components of an opposite polarity to said second coil, said solenoid means being responsive to said signals for magnetically attracting said magnet and sliding the same in said guide means with the magnetic field strength of said solenoid means being proportional to the amplitude of said signals, and spring means maintaining said magnet in equilibrium in said guide means and biasing the same against the magnetic attraction of the solenoid, said spring means having variable tension for controlling the motion of said magnet by said solenoid means thereby providing calibration for said rate indicator means so that the amplitude of said signals are translated by the motion of said magnet to indicate the rate of movement of the automobile on said rate indicator means.

3. An odometer for an automobile including in combination, alternating current signal generator means having a permanent magnet responsive to a predetermined movement of an automobile and producing signal components each representing an increment of movement thereof, electromagnetic motor means including a rotor and stator, said rotor including a tube shaped permanent magnet having one end of one polarity and the other end of the other polarity, an axle through said tube, first and second washers each having a plurality of substantially L-shaped pole pieces integral therewith, said washers mounted to said axle at the opposite ends of and in rotatable contact with said tube shaped magnet so that the integral pole pieces of said first washer have one polarity and the integral pole pieces of said second washer have the other polarity, said pole pieces of said first and second washers rotating in approximately the same plane, said stator including coil means encircling the same and substantially L-shaped integral poles equal in number to said pole pieces of said rotor, said stator and said rotor mounted in coaxial relationship with said poles and pole pieces lying in approximately the same plane and opposing each other with the feet of said L-shaped pole pieces extending in one direction and the feet of said L-shaped poles extending in a direction opposite from said one direction so that said signal components of either polarity from said generator means excites said coil means to rotate the rotor in only one direction, and counter means coupled to said rotor and activated thereby to record each rotation thereof for visually indicating the increments of movement of the automobile.

4. In a system for controlling the rate of movement of a vehicle having means for supplying fuel to the engine thereof controlled by an accelerator device to cause desired vehicle movement, the system comprising a signal generator responsive to a predetermined movement of the vehicle in response to operation of the accelerator device for producing alternating signal pulses with the amplitude of said signal pulses representing the rate of movement thereof, control servoamplifier means, and a rate control potentiometer connected between the signal generator means and the control servoamplifier means for selecting a portion of the generated signal pulses corresponding to the maximum desired rate of movement of the vehicle, the combination including, rate control means including electric actuating means connected to the control servoamplifier means, and mechanical linkage means coupled to said electric actuating means and the fuel supply means and being operable by said electric actuating means to take control of the rate of movement of the vehicle from the accelerator device, with the accelerator device being operated so the rate of movement of the vehicle exceeds the maximum desired rate of movement the selected portion of the generated signal operates said electric actuating means to operate said mechanical linkage means to take control of the fuel supply means thereby taking control of the rate of movement of the vehicle from the accelerator device and deaccelerates the same until the rate of movement of the vehicle returns to the predetermined rate whereby control of the fuel supply means is returned to the accelerator device.

5. The system of claim 4 in which the fuel supply means is the engine carburetor float bowl, and wherein said electric actuating means includes a solenoid, and said linkage means includes linkage connected to said solenoid and the float in the carburetor float bowl, so that with the accelerator device being operated so the rate of movement of the vehicle exceeds the maximum desired rate of movement, the selected portion of the generated signal energizes said solenoid to operate the float through said linkage thereby removing the supply of fuel from the engine and reducing the rate of movement of the vehicle until the same returns to the predetermined rate whereby said solenoid is deenergized to return control of the rate of movement of the vehicle to the accelerator device.

6. The system of claim 4 in which the fuel supply means includes the throttle and wherein said actuating means includes a solenoid and said mechanical linkage means includes linkage connected between said solenoid and the throttle, so that with the accelerator device being operated so the rate of movement of the vehicle exceeds the maximum desired rate of movement the selected portion of the generated signal energizes said solenoid to operate said linkage to disconnect the throttle from the accelerator device to reduce the rate of movement of the vehicle until the same returns to the predetermined rate whereby said solenoid is deenergized and control of the movement of the vehicle is returned to the accelerator device.

References Cited

UNITED STATES PATENTS

| | | | |
|---|---|---|---|
| 508,614 | 11/1893 | Henry | 73—518 |
| 1,933,086 | 10/1933 | Battegay. | |
| 2,428,882 | 10/1947 | Kolff. | |
| 2,471,150 | 5/1949 | Goodale et al. | |
| 3,049,110 | 8/1962 | Kerr | 180—82.1 |
| 3,201,648 | 8/1965 | Kerr | 317—5 |
| 3,172,497 | 3/1965 | Stoner et al. | 180—82.1 |
| 3,249,175 | 5/1966 | Baxter | 180—82.1 |
| 2,169,267 | 8/1939 | McCullough | 123—102 |
| 3,344,880 | 10/1967 | Iwashita et al. | 180—109 |
| 3,116,807 | 1/1964 | Wilson | 180—109 |
| 3,124,693 | 3/1964 | Peras | 180—65 X |

FOREIGN PATENTS

Ad. 4,102      1906    Great Britain.

KENNETH H. BETTS, *Primary Examiner.*